US011089810B2

(12) United States Patent
Karpinsky et al.

(10) Patent No.: US 11,089,810 B2
(45) Date of Patent: Aug. 17, 2021

(54) VIBRATORY BATTER APPLICATION

(71) Applicant: Vibratory Solutions, LLC, Lodi, WI (US)

(72) Inventors: James L. Karpinsky, Madison, WI (US); James M. Bakos, Dig Harbor, WA (US); Stephen Demerath, Green Bay, WI (US); Scott J. Rose, Columbus, WI (US)

(73) Assignee: Vibratory Solutions, LLC, Lodi, WI (US)

( * ) Notice: Subject to any disclaimer, the term of this patent is extended or adjusted under 35 U.S.C. 154(b) by 125 days.

(21) Appl. No.: 16/390,529

(22) Filed: Apr. 22, 2019

(65) Prior Publication Data

US 2019/0328028 A1    Oct. 31, 2019

Related U.S. Application Data

(60) Provisional application No. 62/662,821, filed on Apr. 26, 2018.

(51) Int. Cl.
*A23P 20/15*    (2016.01)
*A23L 13/50*    (2016.01)

(52) U.S. Cl.
CPC .............. *A23P 20/15* (2016.08); *A23L 13/57* (2016.08); *A23V 2002/00* (2013.01); *Y10S 118/04* (2013.01)

(58) Field of Classification Search
CPC .... A23P 20/15; A23P 20/12; A23P 2020/251; A23L 13/57; A23G 3/2076; A23V 2002/00; B65G 47/24; B65G 27/00; B65G 47/1492; B65G 47/56; B65G 47/57; Y10S 118/04
USPC .......... 118/13, 19, 22, 30, 31; 198/773–777; 426/302
See application file for complete search history.

(56) References Cited

U.S. PATENT DOCUMENTS

| | | |
|---|---|---|
| 3,547,075 A | 12/1970 | Johnson |
| 3,860,105 A | 1/1975 | Johnson |
| 4,058,083 A | 11/1977 | Miller |
| 4,351,850 A | 9/1982 | Costamagna et al. |
| 4,496,084 A | 1/1985 | Booth et al. |
| 5,037,536 A | 8/1991 | Koch et al. |
| 5,238,303 A | 8/1993 | Dixon |
| 5,314,056 A | 5/1994 | Davis et al. |
| 5,437,723 A | 8/1995 | Sollich |

(Continued)

*Primary Examiner* — Laura Edwards
(74) *Attorney, Agent, or Firm* — Craig A. Fieschko, Esq.; DeWitt LLP

(57) ABSTRACT

Batter is applied to food products by depositing the products atop a coating pan which vibrates such that the products are transported along the pan. As this occurs, batter is supplied atop the coating pan and the products. The coating pan is preferably configured such that the products tumble across the pan, thereby better ensuring that the products are coated on all sides with batter. The products are then received on a vibrating drainage pan having a perforated drainage pan surface, whereby excess batter drains from the batter-coated products through the perforations as the products are transported across the drainage pan. Batter-coated products leaving the drainage pan can then be received by a fryer, oven, conveyor, or other food processing equipment.

15 Claims, 2 Drawing Sheets

(56) References Cited

U.S. PATENT DOCUMENTS

| | | |
|---|---|---|
| 5,465,525 A * | 11/1995 | Mifune .................. A01M 7/00 43/132.1 |
| 5,555,967 A | 9/1996 | Hufford |
| 6,276,518 B1 | 8/2001 | Wierman |
| 6,286,658 B1 | 9/2001 | Hufford |
| 6,308,822 B1 | 10/2001 | Moran et al. |
| 6,406,680 B1 | 6/2002 | Priebe |
| 6,505,547 B1 | 1/2003 | Burnett et al. |
| 6,655,523 B2 | 12/2003 | Jones et al. |
| 6,868,960 B2 | 3/2005 | Jones |
| 7,475,767 B2 | 1/2009 | Crawford et al. |
| 7,703,411 B1 | 4/2010 | Bakos et al. |
| 7,757,836 B2 | 7/2010 | Karpinsky et al. |
| 7,775,343 B2 | 8/2010 | Kemph et al. |
| 7,842,896 B1 | 11/2010 | Calcoen et al. |
| 7,874,081 B2 | 1/2011 | Ewen |
| 7,878,142 B2 * | 2/2011 | Taylor ..................... A23L 19/18 118/13 |
| 8,181,592 B2 | 5/2012 | Karpinsky et al. |
| 8,283,589 B2 | 10/2012 | Janssens et al. |
| 8,359,995 B2 | 1/2013 | Bakos et al. |
| 8,517,168 B2 | 8/2013 | Hufford |
| 8,708,153 B2 | 4/2014 | Hufford et al. |
| 8,714,362 B2 | 5/2014 | Jones et al. |
| 8,733,540 B2 | 5/2014 | Woiler et al. |
| 9,126,765 B2 | 9/2015 | Groenewald et al. |
| 9,132,966 B1 | 9/2015 | Groenewald et al. |
| 9,181,037 B1 | 11/2015 | Tomlinson et al. |
| 9,254,965 B2 | 2/2016 | Groenewald |
| 9,277,754 B2 | 3/2016 | Karpinsky et al. |
| 9,370,197 B1 | 6/2016 | Karpinsky et al. |
| 9,408,283 B2 | 8/2016 | Jones et al. |
| 9,415,941 B2 | 8/2016 | Woiler et al. |
| 9,463,935 B1 | 10/2016 | Karpinsky et al. |
| 9,481,525 B1 | 11/2016 | Dunham et al. |
| 9,481,526 B1 | 11/2016 | Groenewald |
| 9,635,880 B2 | 5/2017 | Bakos et al. |
| 9,776,805 B2 | 10/2017 | Groenewald |
| 10,011,426 B1 | 7/2018 | Karpinsky et al. |
| 2008/0283366 A1 * | 11/2008 | Karpinsky ........... A21C 15/002 198/763 |

* cited by examiner

VIBRATORY BATTER APPLICATION

CROSS-REFERENCE TO RELATED APPLICATIONS

This application claims priority under 35 USC § 119(e) to U.S. Provisional Patent Application 62/662,821 filed 26 Apr. 2018, the entirety of which is incorporated by reference herein.

FIELD OF THE INVENTION

This document concerns an invention relating generally to devices and methods for coating food products, and more specifically to devices and methods for coating food products with batter.

BACKGROUND OF THE INVENTION

Many food products are coated with batter, and typically then at least partially cooked to better adhere the batter to the food products, before being provided to consumers for final cooking and consumption. ("Batter" refers to easily pourable dough—having a viscosity of 75,000 centipoise or less, and more typically within 5,000 centipoise of 30,000 centipoise—often made of little more than flour, water, and perhaps seasonings.) Common examples are chicken and fish, which are batter-coated, partially cooked, and then frozen and packaged for sale in supermarkets and other sales outlets. Consumers then purchase these food products to be cooked to completion.

Preparation of the battered product is difficult because of the desire to fully and evenly coat food products with batter on all sides prior to par-cooking, and the difficulties with preserving the batter coatings prior to and during par-cooking. Typically, food products are conveyed atop a wire belt, sometimes with an upper "hold-down" belt passing the food products down on the lower wire belt, as batter is poured atop the products, and/or as the products are conveyed through a pool of batter. Excess batter then runs off the food products, and through openings in the belt(s), as the food products are conveyed toward a par-cooker (e.g., an oven or fryer). The same or similar wire belt(s) may transport the battered food products through the par-cooker. The wire belts require complete cleaning between production runs, and because the belts present many spaces and crevices in which batter can collect, cleaning is time-consuming. This can increase the shut-down time between production runs, which decreases productivity. Additionally, wire belts are prone to breakage and spalling over time, and pieces of metal can collect in the sticky batter and contaminate the food products. Moreover, wire-belt conveyors typically require a high degree of maintenance owing to their many moving components. It would therefore be useful to have devices and methods for applying batter to food products which provide complete and even coating with batter, and which do not suffer from the disadvantages arising from the use of wire belts.

SUMMARY OF THE INVENTION

The invention involves batter application machines and methods which are intended to at least partially solve the aforementioned problems. To give the reader a basic understanding of some of the advantageous features of the invention, following is a brief summary of an exemplary version of the invention, with reference being made to the accompanying drawings (which are briefly reviewed in the following "Brief Description of the Drawings" section of this document) to assist the reader's understanding. Since the following discussion is merely a summary, it should be understood that more details regarding the exemplary and other versions of the invention may be found in the Detailed Description set forth elsewhere in this document. The claims set forth at the end of this document then define the various versions of the invention in which exclusive rights are secured.

The accompanying FIGS. 1 and 2 illustrate an exemplary batter applicator machine 100 suitable for applying batter to food products. The batter applicator 100 includes a coating pan 102 and a drainage pan 104 connected to a frame 106, and a chassis 108 which bears a vibrator 110, with springs 112 coupling the frame 106 to the chassis 108. As a result, when the vibrator 110 on the chassis 108 is activated, its vibration is transferred to the frame 106 (and to the coating pan 102 and drainage pan 104 thereon) such that food products move along a product travel path from the coating pan 102 to the drainage pan 104. A batter supply assembly 114 is situated above the coating pan 102 at the batter applicator 100's input end 116 (the end which receives products to be battered), whereby batter falls on food products deposited atop the coating pan 102 as the vibration of the frame 106 urges the food products along the coating pan 102. The battered food products then travel along the drainage pan 104, shedding excess batter, to leave the batter applicator 100 at its output end 118. The batter applicator 100's components and operation will now be reviewed in greater detail.

The coating pan 102 has a coating pan surface 120 extending from a coating pan input end 122 (FIG. 1) to a coating pan output end 124. The batter supply assembly 114, which may be of any type suitable to supply batter atop the coating pan 102 (and atop any food products thereon), preferably provides a constant flow of batter atop the coating pan surface 120 at or near the coating pan input end 122, such that the entirety (or nearly the entirety) of the coating pan 102 is coated with batter. Thus, when food products are placed on the coating pan surface 120 at the coating pan input end 122, they are preferably placed on batter. As the coating pan 102 vibrates with the frame 106, the food products are urged along a product travel path from the coating pan input end 122 to the coating pan output end 124, with the vibration (and any tumbling of the products) helping to further coat the food products with batter. To assist with tumbling of the food products, and coating of all sides of the food products with batter, the coating pan input end 122 is preferably higher than the coating pan output end 124, with the slope of the coating pan 102 being such that it promotes tumbling of the food products in question. Alternatively or additionally, the coating pan surface 120 can be nonplanar, and configured to promote tumbling. As an example, the depicted coating pan surface 120 has a series of steps 126 descending from the coating pan input end 122 toward the coating pan output end 124. Each step 126 has a greater step length along the product travel path than a step height with respect to any adjacent step 126, such that food products dwell on each batter-covered step 126 before falling to the next step 126.

The drainage pan 104 has a perforated drainage pan surface 128 extending between a drainage pan input end 130 and a drainage pan output end 132, with the drainage pan input end 130 receiving coated food products from the coating pan output end 124. As batter-coated food products are vibratorily conveyed across the drainage pan surface 128, excess batter falls from the food products to flow through the perforations 134. The drainage pan surface 128 has concave depressions 136 defined therein (e.g., bowl-like indents), with each perforation 134 in the drainage pan 104 being at the bottom of one of the depressions 136. This arrangement better allows food products to travel across the drainage pan surface 128 without catching on the edges of any of the perforations 134.

The batter applicator 100 is preferably configured such that the drainage pan 104 protrudes from the applicator 100 in cantilever fashion, with ample free space below a major portion of the drainage pan 104 (more particularly, below the batter applicator's output end 118), such that a conveyor, fryer, or other food processing machine can readily receive batter-coated food products exiting the drainage pan output end 132. The chassis 108 extends upwardly as it advances from the batter applicator 100's input end 116 toward its output end 118, such that at least a portion of the drainage pan 104 is situated beneath the chassis 108, with at least some of the springs 112 descending from the chassis 108 to the frame 106 carrying the drainage pan 104.

To summarize, batter is applied to food products by oscillating the coating pan 102 and drainage pan 104 (via the vibrator 110 on the frame 106 carrying the pans), such that food products thereon will move along the product travel path from the batter applicator 100's input end 116 toward its output end 118. Food products to be battered are deposited atop the coating pan 102 near the coating pan input end 122. Batter is then supplied by the batter supply assembly 114 atop the coating pan 102 adjacent the coating pan input end 122, coating the tops of the food products as they travel through the batter, and also preferably providing a "bed" of batter onto which the food products are placed. The food products may be further coated with batter as they tumble across any incline and/or discontinuities defined in the coating pan 102. Excess batter then falls from the food products as they enter the drainage pan input end 130, travel across the perforated drainage pan surface 128, and then exit the drainage pan output end 132, where they might be received by further food processing equipment (such as a breader which applies flour and/or crumbs to the batter coating, a fryer, an oven, a conveyor, etc.). It is notable that conveying battered food products via vibration usefully deters product voids ("bald" and batter-free portions of food products owing to products touching during batter application) and product marriages (products sticking/fusing together), as vibration deters extended contact between products.

Further potential advantages, features, and objectives of the invention will be apparent from the remainder of this document in conjunction with the associated drawings.

DETAILED DESCRIPTION OF EXEMPLARY VERSIONS OF THE INVENTION

Figure 1:
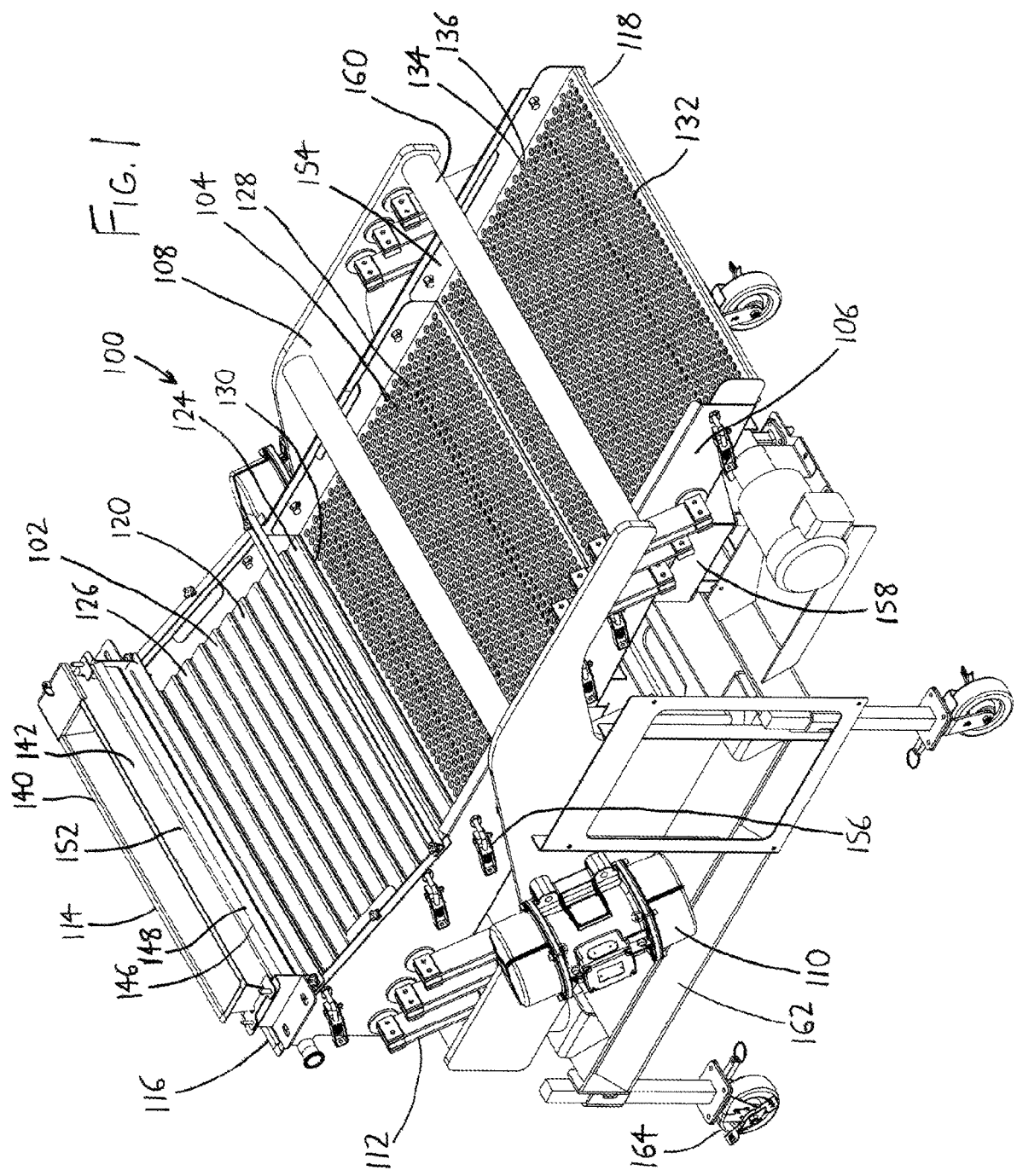
FIG. 1 depicts an exemplary batter applicator machine 100 with its drainage pan 104 in the foreground.

Expanding on the discussion above, the coating pan 102 and drainage pan 104 are each typically formed as one or more sheets of material which may be bent, perforated, adorned (for example, with fins or wedges), or otherwise constructed to have surface features which have desired effects on the travel of the food products in question along the pan. To illustrate, the coating pan 102 of the depicted batter applicator machine 100, when used to apply batter to chicken cutlets, has steps 126 which each have a length along the product travel path which approximates the average horizontal/lateral dimensions of a chicken cutlet, and a height which is approximately equal to the thickness of a chicken cutlet. These dimensions have been found to promote tumbling of the batter-coated cutlet along the batter-coated coating pan 102 (at least when using the type of batter desired for the cutlets, and when the depicted vibratory arrangement is used at its default oscillation frequency). However, food products having different dimensions (e.g., vegetables, cheese sticks, etc.) might benefit from different coating pan 102 configurations. The coating pan 102 might also or alternatively have an extended planar or slightly depressed region immediately adjacent its coating pan input end 122 in which batter collects to help ensure that the bottoms of incoming food products are thoroughly coated with batter prior to reaching the depicted drainage pan 104. To assist this function, the coating pan surface 120 might bear one or more perforations 134 from which batter is pumped (e.g., from a slot adjacent the coating pan input end 122), providing a puddle of batter onto which incoming food products are deposited (and with the flow of batter usefully helping to carry food products forwardly along the product travel path).

Similarly, the drainage pan 104 can be differently configured to better suit the food products being coated and the characteristics of the batter (its viscosity, its input/flow rate, etc.). Some or all perforations 134 might be shaped as other than circular holes (e.g., as elongated slots, as triangular holes or chevron-shaped slots, etc.), and the sizes of the perforations 134 can vary across the drainage pan surface 128 (as by having larger perforations 134 near the drainage pan input end 130, and smaller perforations 134 near the drainage pan output end 132, such that batter depth is maintained relatively constant across the drainage pan surface 128). The drainage pan surface 128 might be at least partially defined by a mesh sheet, as an array of parallel bars/rods, and/or by a louvered/corrugated sheet (wherein perforations 134 might be provided in at least the valleys in the sheet).

Additional pans could be provided prior to, following, and/or between the coating pan 102 and drainage pan 104, and/or one or both of the coating pan 102 and drainage pan 104 can be formed in separate sections (as with the depicted drainage pan 104, which is actually formed in two separate sections, or as two separate drainage pans, in the illustrated batter applicator machine 100). As an example, an unadorned planar pan might be included somewhere downstream the coating pan 102, and might be cooled or heated to adapt the viscosity of the batter on the coated food products riding on the pan, and/or to partially cook the batter.

The depicted batter supply assembly 114 is of the "waterfall enrober" type, wherein batter within a reservoir flows through one or more slot-like apertures extending over and across the coating pan 102, such that one or more continuous thin curtains of batter fall from the apertures toward the coating pan 102. In the depicted batter supply assembly 114, batter is pumped through a batter inlet 138 (FIG. 2) into an upper receiving compartment 140, which has descending front and rear walls 142 (FIG. 1) and 144 (FIG. 2) which extend above and across the width of the coating pan 102, and which extend downwardly into the interior of a lower reservoir 146 to stop slightly above the floor of the lower reservoir 146, defining an open bottom in the upper receiving compartment 140. The upper receiving compartment 140 is typically provided with a cover which extends across its open top to prevent batter from overflowing from the upper receiving compartment 140, but such a cover is not mandatory, and is not shown. The lower reservoir's front and rear walls 148 (FIG. 1) and 150 (FIG. 2) then rise adjacent the upper receiving compartment's front and rear walls 142 and 144 to stop slightly below the batter inlet 138. As a result of this arrangement, batter supplied into the batter inlet 138 collects within and fills the (covered) upper receiving compartment 140 to drain from its open bottom into the lower reservoir 146, and is pushed therefrom by the pressure of the batter flowing from the upper receiving compartment 140 to flow from the slots 152 defined between the top edges of the front and rear reservoir walls 148 and 150 and the opposing front and rear walls 142 and 144 of the upper receiving compartment 140. The batter therefore flows over the rear wall 150 of the lower reservoir 146 as a first curtain of batter encountered by product on the coating pan 102, and similarly flows over the front wall 148 of the lower reservoir 146 as a second curtain.

Other types of enrober batter supply assemblies could be used instead, including ones which dispense only a single curtain of batter, or more than two curtains (such as a series of curtains spaced at intervals across all or part of the length of the coating pan 102). The batter supply assembly 114 could alternatively be a shower-type or spray-type batter applicator, where a reservoir or conduit (which may contain pressurized or unpressurized batter) supplies batter through apertures to shower, spray or otherwise deposit the batter onto the coating pan 102 (and onto any product thereon). A spreader-type batter applicator, wherein a spray of batter is generated by applying batter to a spinning disc, spinning blades, or other spinning structures, could instead or also be used. The batter supply assembly 114 could also or alternatively be provided by the aforementioned pumping of batter through a slot or other perforation(s) provided in the coating pan 102, or provided slightly off of the coating pan 102 and adjacent to the coating pan input end 122.

While not depicted in the drawings, the batter supply assembly 114 might include a means for adjusting the temperature of the batter, such as conduits which circulate cooling fluid about any batter reservoirs or conduits, and/or thermoelectric coolers. Cooling the batter can increase its viscosity (and thus its adhesion to product), as well as inhibiting bacterial growth.

The exemplary batter applicator machine 100 might also include a batter removal assembly (apart from the drainage pan 104) to assist with the removal of excess batter from food products. As an example, one or more air knives—that is, a supply of pressurized air, typically providing a curtain of pressurized air—might be situated above the drainage pan 104 and/or coating pan 102, helping to blow excess batter downwardly off of coated food products.

Figure 2:
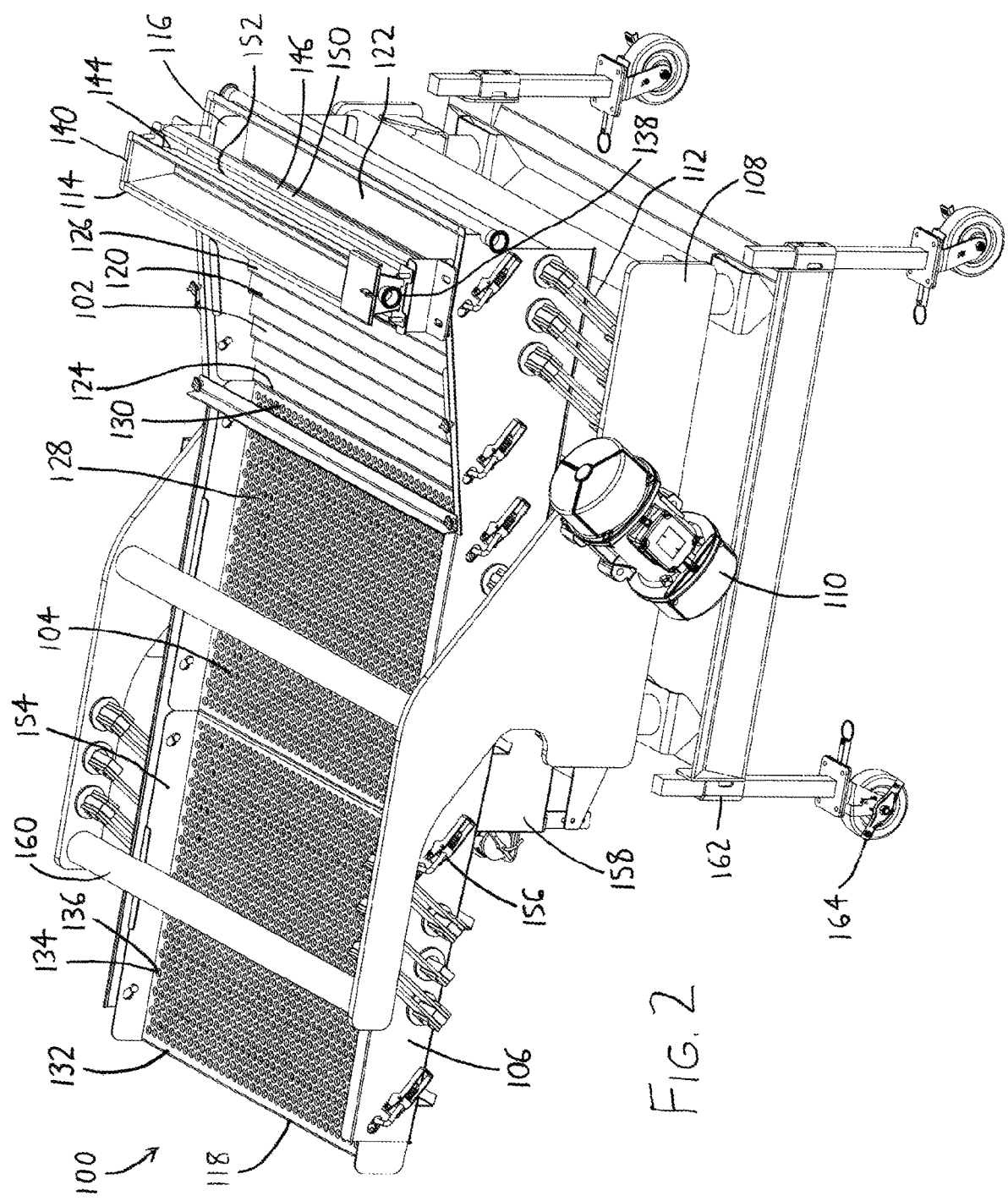
FIG. 2 depicts the batter applicator machine 100 of FIG. 1 from a vantage nearly opposite that used in FIG. 1.

The frame 106 supporting the coating pan 102 and drainage pan 104 preferably supports at least the outer sides/edges of the pans 102 and 104, but does not directly support the pan surfaces 120 and 128, or at least leaves a major part of the perforated drainage pan surface 128 unsupported/unobstructed so that batter freely drains from the drainage pan surface 128. In the exemplary batter applicator machine 100, the coating pan 102 and drainage pan 104 have upward bends 154 at their side edges, with these bends 154 then being removably attached to the frame 106 via hand-operable latches 156 so that the pans 102 and 104 can be easily removed from the frame 106 for cleaning and subsequent replacement. The upward bends 154—which, if desired, can rise substantially above the frame 106—help isolate the frame 106 from batter flowing on (and splashing from) the pans 102 and 104. A collection pan 158, only a portion of which is visible in FIGS. 1 and 2, is affixed to the frame 106 below the drainage pan 104, and has floors which slope downwardly to a drain, such that batter falling from the drainage pan 104 collects in the collection pan 158, and ultimately in the drain. A suitable pump and conduit can then pump the collected batter to the batter supply assembly 114 for reuse, supplementing any supply of fresh batter (that is, batter which has not yet been collected from the drainage pan 104 for reuse/recycling). Valves and/or other components for adjusting flow, and screens/filters and/or other components which promote batter quality, can be included along the conduit as needed.

The chassis 108 extends adjacent the opposing sides of the frame 106, with springs 112 (here leaf springs) bridging the chassis 108 and frame 106. The chassis 108 is preferably configured such that it rests above the frame 106 at the batter applicator 100's output end 118, with the springs 112 descending to connect to the frame 106. This allows the batter applicator 100 to be unobstructed beneath its output end 118, whereby its output end 118 can rest above, and deposit battered food products on or into, a subsequent food processing machine. In contrast, the chassis 108 preferably rests below the frame 106 at the batter applicator 100's input end 116, allowing ready access to and maintenance of the batter supply assembly 114. Bars 160 extend between the opposing sides of the chassis 108 above the drainage pan 104, and below the coating pan 102, to provide stiffness.

One or more vibrators 110 on the chassis 108 then transmit vibration to the frame 106 (and the pans 102 and 104 thereon) via the leaf springs 112. In the exemplary batter applicator 100, each vibrator 110 takes the form of a rotary motor carrying a rotating imbalance, which spins about an axis oriented at an acute angle with respect to the horizontal. The vibrations caused by the rotating imbalances cause the ends of the leaf springs 112 coupled to the frame 106 to sway in vertical planes coincident with the springs 112 (that is, in vertical planes extending alongside and between the chassis 108 and frame 106), thereby oscillating the frame 106 in directions oriented parallel to the product travel path. The force vectors imparted on the food products traveling on the pans 102 and 104 are in a forward (input end 116 to output end 118) and upward direction, driving the food products forwardly from the input end 116 to the output end 118.

The vibrator(s) 110 may take other forms, and may use any of the vibrating/oscillating arrangements used in known vibratory conveyors (also known as reciprocating conveyors, shaking conveyors, shuffle conveyors, and differential impulse conveyors, among other names). Exemplary arrangements can be found in conveyors and other equipment made by Vibratory Solutions, LLC of Lodi, Wis. (USA) (with examples being seen in U.S. Pat. Nos. 10,011,426; 9,635,880; 9,463,935; 9,370,197; 9,277,754; 8,359,995; 8,181,592; 7,757,836; and 7,703,411); and in conveyors and other equipment made by Key Technology Inc. of Walla Walla, Wash. (USA) (with examples being seen in U.S. Pat. Nos. 9,776,805; 9,481,526; 9,481,525; 9,415,941; 9,408,283; 9,254,965; 9,181,037; 9,132,966; 9,126,765; 8,733,540; 8,714,362; 8,708,153; 8,517,168; 8,283,589; 7,874,081; 7,842,896; 7,775,343; 7,475,767; 6,868,960; 6,655,523; 6,460,680; 6,308,822; 6,286,658; 6,276,518; 5,555,967; 5,314,056; and 5,037,536). The technical content of all of the foregoing patents should be regarded as incorporated within this document, such that this technical content forms a portion of this document's content.

A wheeled carriage 162 then rests below the chassis 108, and supports the chassis 108 on shock absorbers so that no or little vibration is transmitted to the carriage 162. The carriage 162 may be raised and lowered on its wheels 164, whereby the batter applicator 100 can be wheeled to a desired location along a food processing line, and may have its height appropriately adapted to receive food products from an upstream food processing machine for batter-coating, and to dispatch the coated products to a downstream food processing machine.

An exemplary version of the invention is shown in the drawings and described above merely to illustrate possible features, and a possible configuration, of the invention. The invention may be modified in numerous respects, as by adopting or substituting features shown in the patents listed above. The invention is therefore not intended to be limited to the exemplary version of the invention described above, but rather is intended to be limited only by the claims set out below. Thus, the invention encompasses all different versions that fall literally or equivalently within the scope of these claims.

What is claimed is:

1. A batter applicator for applying batter to food products, the batter applicator including:
   a. a coating pan having a coating pan surface extending between a coating pan input end to a coating pan output end, the coating pan having a series of steps descending from the coating pan input end to the coating pan output end;
   b. a batter supply assembly:
      (1) situated above the coating pan surface, and
      (2) having one or more apertures through which batter flows atop the coating pan surface;
   c. a drainage pan:
      (1) situated:
         (a) to receive food products from the coating pan output end, and
         (b) lower than the coating pan input end, and
      (3) being perforated, whereby batter flows through the perforations;
   d. a vibrator coupled to the coating pan and drainage pan such that vibrations from the vibrator move food products along a product travel path from the coating pan to the drainage pan,
   wherein each step has a greater length along the product travel path than a height with respect to any adjacent step.

2. The batter applicator of claim 1 wherein the coating pan input end is higher than the coating pan output end.

3. The batter applicator of claim 2 wherein the coating pan surface is nonplanar, whereby food products tumble while traveling from the coating pan input end to the coating pan output end along the product travel path.

4. The batter applicator of claim 1 wherein each perforation is situated at the bottom of a respective concave depression formed in the drainage pan surface.

5. The batter applicator of claim 1 wherein:
   a. the coating pan and drainage pan are affixed to a frame, and
   b. the vibrator is coupled to the frame by springs.

6. The batter applicator of claim 5 wherein:
   a. the vibrator is attached to a chassis, and
   b. the frame is coupled to the chassis by the springs.

7. The batter applicator of claim 6 wherein at least a portion of the drainage pan is situated beneath the chassis, with at least some of the springs descending from the chassis to the frame.

8. A batter applicator for applying batter to food products, the batter applicator including:
   a. a coating pan having a coating pan surface extending between a coating pan input end to a coating pan output end, wherein:
      (1) the coating pan input end is higher than the coating pan output end, and
      (2) the coating pan surface is nonplanar, has a series of steps descending from the coating pan input end to the coating pan output end, whereby food products tumble while traveling from the coating pan input end to the coating pan output end along a product travel path through the batter applicator;
   b. a drainage pan having a drainage pan surface extending between a drainage pan input end to a drainage pan output end, wherein:
      (1) the drainage pan input end follows the coating pan output end along the product travel path, and
      (2) the drainage pan surface is perforated;
   c. a batter supply assembly adjacent the coating pan input end, the batter supply assembly being configured to supply batter atop the coating pan;
   d. a vibrator configured to oscillate the coating pan and drainage pan so that food products move along the product travel path,
   wherein each step has a greater length along the product travel path than a height measured with respect to any adjacent step.

9. The batter applicator of claim 8 wherein the batter supply assembly:
   a. is situated above the coating pan surface, and
   b. has one or more apertures through which batter flows toward the coating pan surface.

10. The batter applicator of claim 8 wherein the drainage pan includes concave depressions defined therein, with each perforation in the drainage pan being at the bottom of one of the depressions.

11. The batter applicator of claim 8 further including:
   a. a frame to which the coating pan and the drainage pan are affixed, and
   b. springs coupling the frame to the vibrator.

12. The batter applicator of claim 8 further including:
   a. a chassis bearing the vibrator thereon, and
   b. a frame coupled to the coating pan and drainage pan, and
   c. springs coupling the frame to the chassis.

13. The batter applicator of claim 12 wherein:
   a. at least a portion of the drainage pan is situated beneath the chassis, and
   b. at least some of the springs descend from the chassis to the frame.

14. A method for applying batter to food products, the method including the steps of:
   a. providing the batter applicator of claim 8,
   b. depositing food products atop the coating pan near the coating pan input end,
   c. supplying batter atop the coating pan adjacent the coating pan input end via the batter supply assembly,
   d. oscillating the coating pan and drainage pan to move food products along the product travel path.

15. A method for applying batter to food products, the method including the steps of:
   a. providing the batter applicator of claim 1, b. depositing food products atop the coating pan near the coating pan input end, wherein the food products:
   (1) tumble downwardly along the coating pan to the coating pan output end, and
   (2) are subsequently received atop the drainage pan;
c. supplying batter atop the coating pan and the food products thereon;
d. oscillating the coating pan and drainage pan to move the food products along the product travel path.

* * * * *